Sept. 21, 1943.                J. A. COXE                2,329,982
                              FISHING REEL
                  Filed March 13, 1939        4 Sheets-Sheet 1
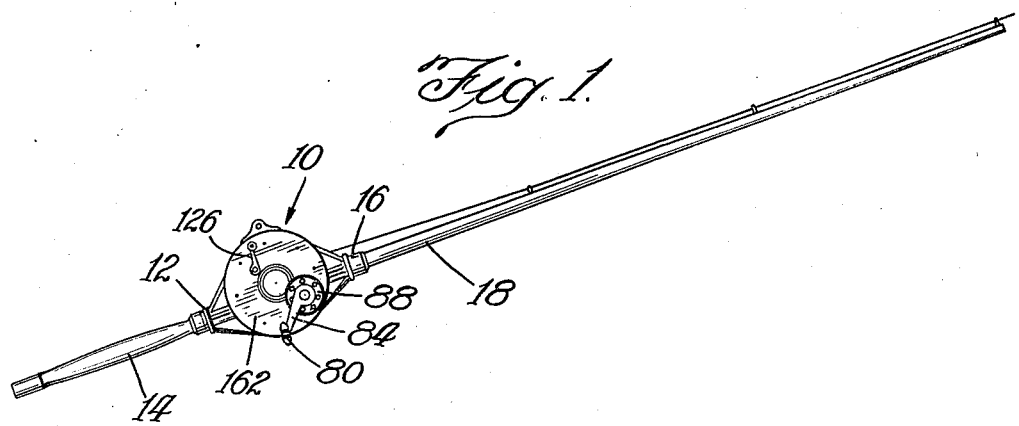
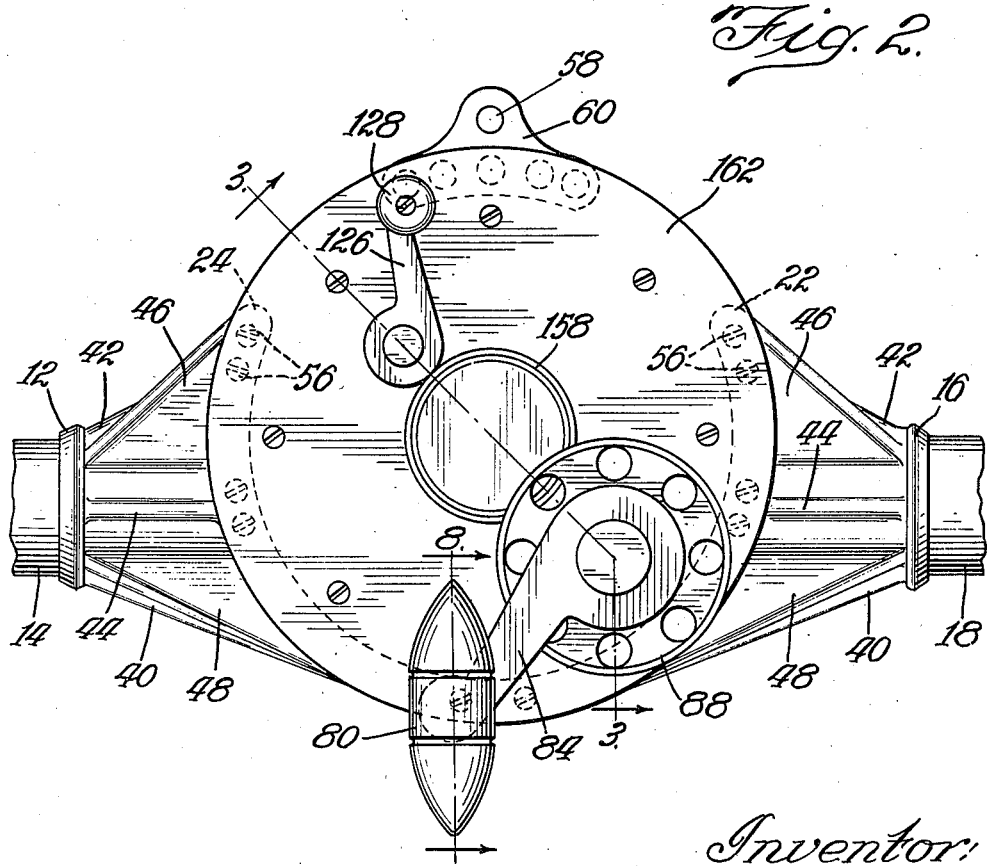

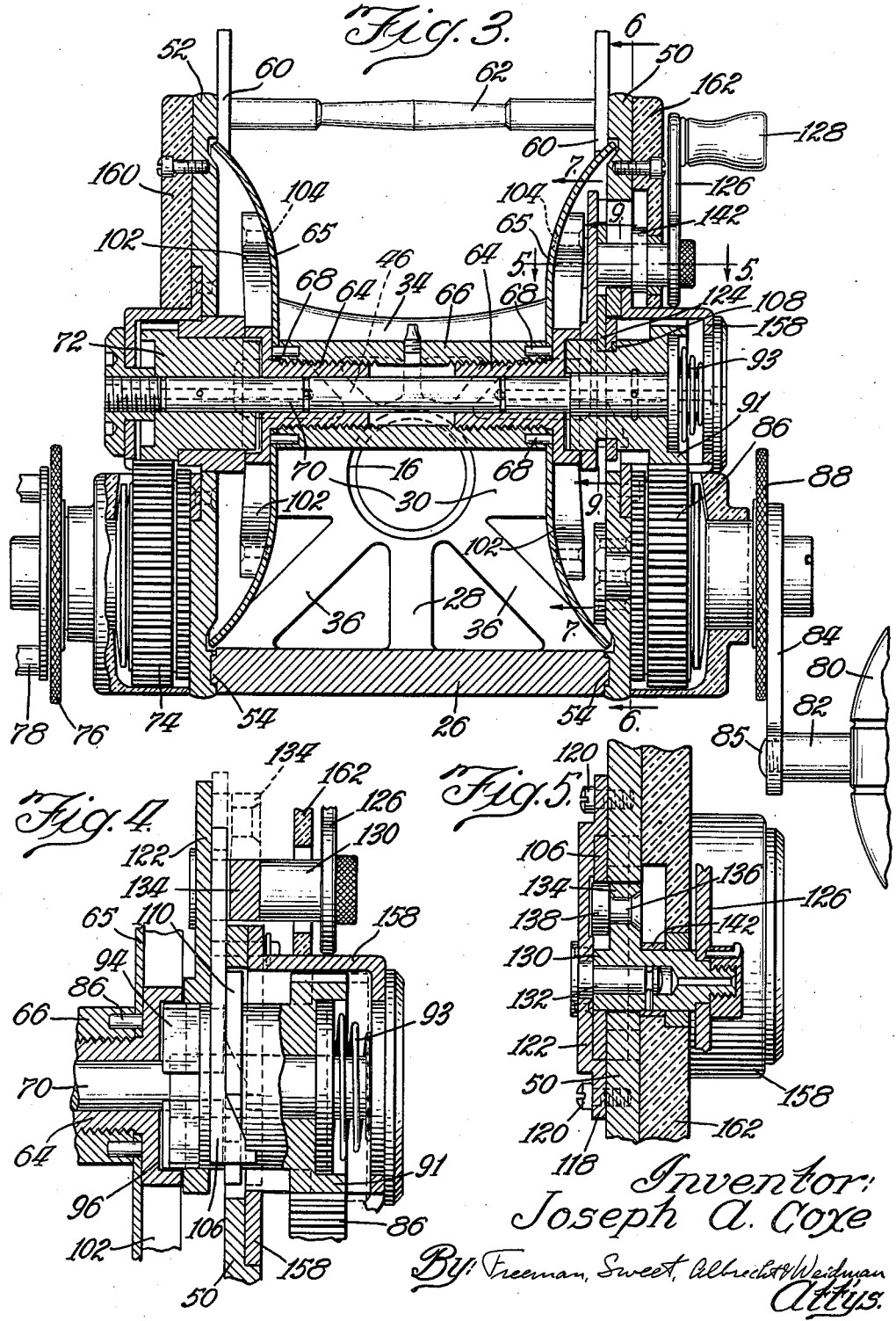

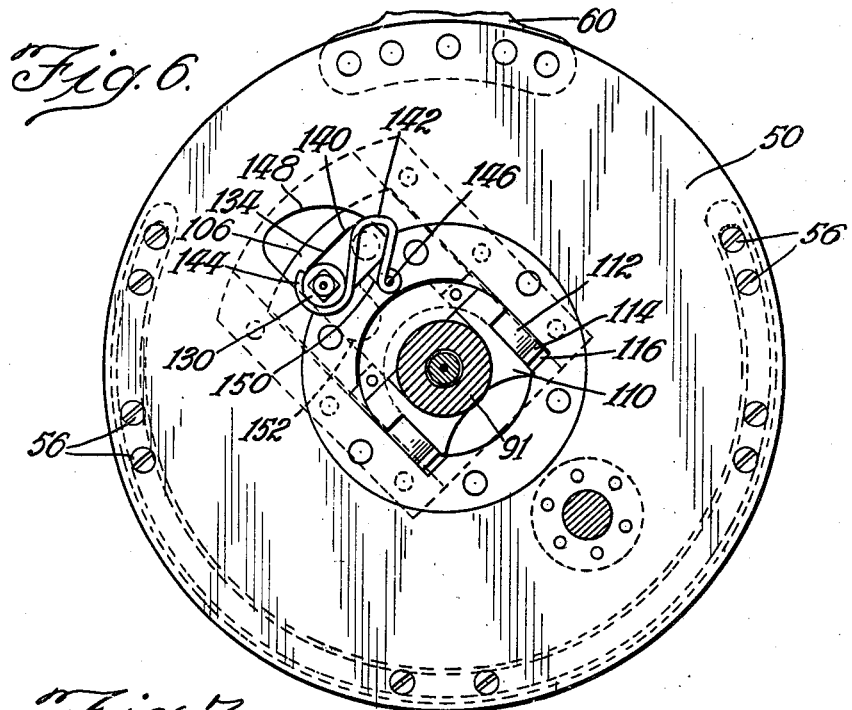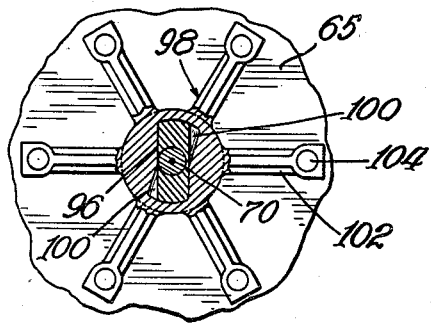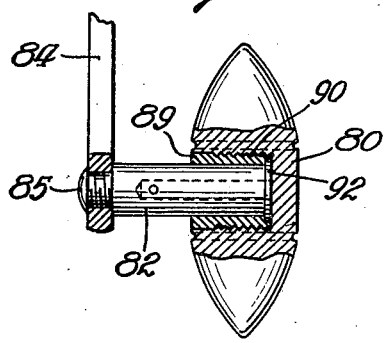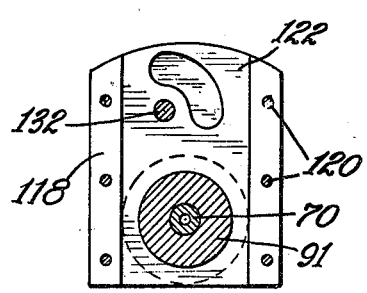

Sept. 21, 1943.   J. A. COXE   2,329,982
FISHING REEL
Filed March 13, 1939   4 Sheets-Sheet 4
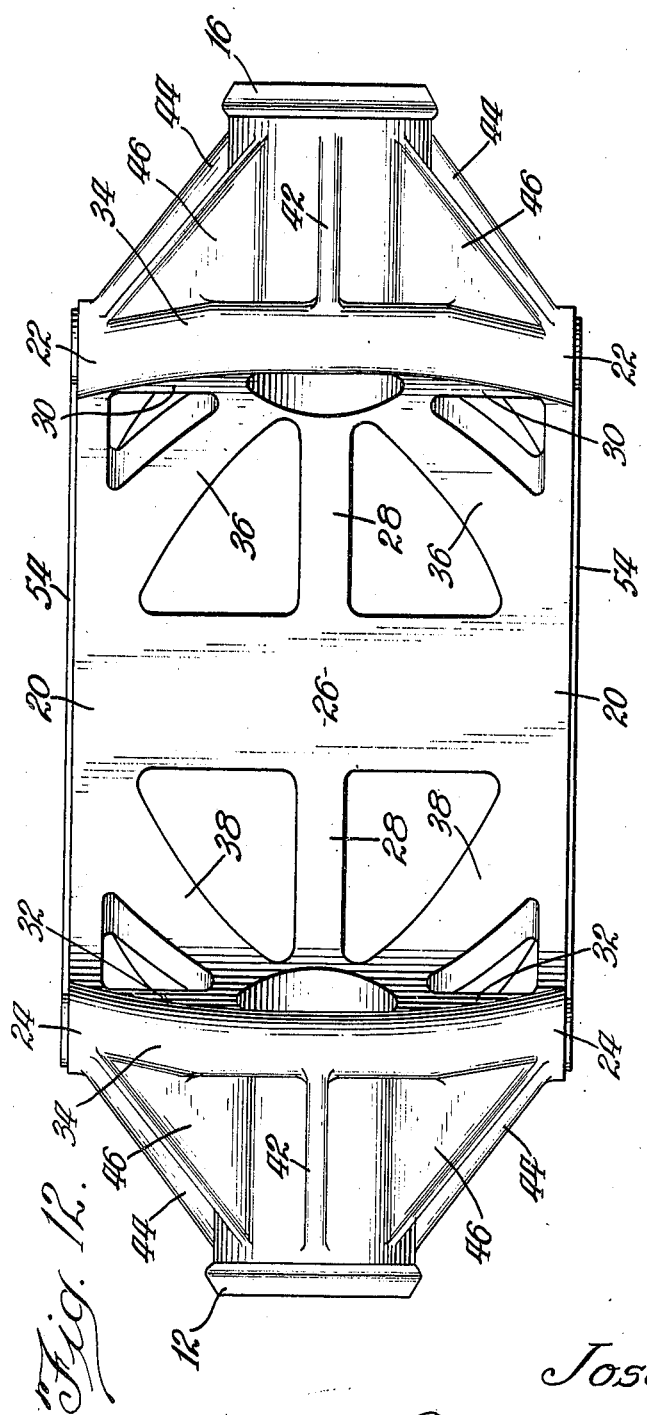
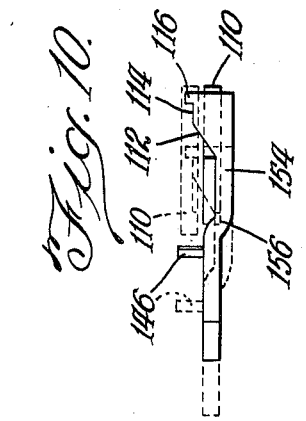
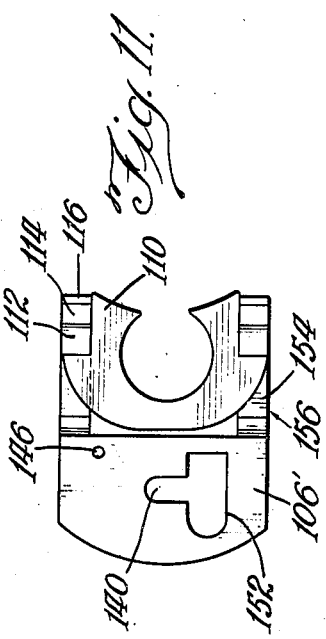
Inventor:
Joseph A. Coxe
By Freeman, Sweet, Albrecht & Weidman
Attys.

Patented Sept. 21, 1943

2,329,982

UNITED STATES PATENT OFFICE 2,329,982

FISHING REEL

Joseph A. Coxe, Los Angeles, Calif., assignor to Bronson Reel Company, Bronson, Mich., a corporation of Michigan Application March 13, 1939, Serial No. 261,486

2 Claims. (Cl. 43—20)

My invention relates to fishing reels, particularly of the type that usually has to be too large and heavy for the user to carry or support with his hands while in use, which type of reel I characterize as a deep sea fishing reel.

The present invention represents a continuation in part and improvement of the invention disclosed in my copending application, Serial Number 109,099, filed November 4, 1936, now Patent 2,251,782, issued August 5, 1941, and includes among its objects and advantages a lighter and at the same time more rigid frame than that of my prior application, and a greater variety of quick adjustments to meet specific emergencies that frequently occur in playing very large and heavy fish.

In the accompanying drawings:

Figure 1 is a side elevation of a complete rod and reel ready for fishing, including a reel according to the invention;

Figure 2 is a side elevation of the reel of Figure 1;

Figure 3 is a section on line 3—3 of Figure 2;

Figure 4 is an enlargement of the disconnecting clutch of Figure 3;

Figure 5 is a section on line 5—5 of Figure 3;

Figure 6 is a section on line 6—6 of Figure 3;

Figure 7 is a section on line 7—7 of Figure 3;

Figure 8 is a detail of the mounting for the handle on line 8—8 of Figure 2;

Figure 9 is a detail of the supporting plate for the clutch shifting mechanism as on line 9—9 of Figure 3;

Figure 10 is a side elevation of an alternative construction for the slidable clutch shifting element and yoke;

Figure 11 is a plan view of the parts illustrated in Figure 10; and

Figure 12 is a plan view of the frame truss, or spider.

In the embodiment of the invention selected for illustration, the reel proper designated as a whole by the reference character 10 includes a cylindrical socket at 12 for the rod butt 14 and a smaller cylindrical socket at 16 to receive the end of the rod tip 18. The sockets 12 and 16, as best indicated in Figures 2, 3, and 12, are integral parts of a unitary one piece frame casting, which is cast in the form of a truss or spider to secure lightness. In practice this truss is cast of a lightweight metal alloy, the chief ingredient of which is aluminum, and additional lightness is secured by employing certain alloys whose strength can be increased by heat treatment after casting. The main portion of the truss as viewed in Figure 2 is substantially in the form of the letter C opening upwardly. The circular edge members 20 each terminate in a front horn 22 and a rear horn 24, and extend continuously around the periphery of the structure from one horn to the other. At the bottom in the middle is a wide beam 26 which intersects the relatively narrow peripheral beam 28 at right angles in the middle of the structure. At the level of the axis of the sockets 12 and 16 are similar cross beams 30 and 32 of approximately the same size as the bottom cross beam 26. At the extreme lips of the C, as best indicated in Figure 3, there are narrower cross beams 34 curved slightly downward and slightly outward between their ends. Diagonal brace members 36 and 38 extending from the junction of the peripheral beam 20 and the bottom cross beam 26 diagonally up toward the axis of the sockets 12 and 16, complete the main portion of the frame. Each of the sockets 12 and 16 is braced by eight relatively thin flying buttresses. The bottom buttress 40 merges with the central arcuate beam 28. The top buttress 42 joins the center of the lip beam 34. The side buttresses 44 join the cross beams 30 and 32. The upper diagonal buttresses 46 run to the ends of the lip beams 34 where they join the ends of the arcuate edge beams 20. And the lower diagonal buttresses 48 merge with the diagonal braces 36 and 38. This arrangement of beams and buttresses braces all parts of the frame against all the stresses encountered in use in such a way as to employ a minimum of metal.

The head end plate 50 and tail end plate 52, accordingly, support and house the rotatable spool and transmission parts associated therewith, and are themselves supported by the truss frame, rather than constituting the support for the sockets for the rod butt and tip as in my prior application. However, the end plates and truss frame add additional strength and reinforce each other by reason of a tongue and groove connection comprising an arcuate tongue 54 projecting from the center of each edge beam 20, which tongue is accurately fitted in an arcuate groove in the adjacent end plate. Assembly is maintained by a plurality of fastening screws 56.

To provide the customary attachment means for the supporting harness I have indicated sockets 58 formed in plates 60 fastened to the inner faces of the end plates, and, to afford a convenient hand hold to the user when using the reel I connect these plates 60 by means of a pillar 62.

The spool disclosed is generally similar to that illustrated in my prior application above referred to except that before driving the threaded inner end sleeves 64 home, I first rivet each of the end bells 65 to the main sleeve 66 by means of dowel pins 68. These dowel pins are subsequently covered up by the flanges of the end sleeves 64 and provide a positive keyed connection to prevent relative rotation between the sleeve 66 and the end bells 65. As the main forces generated in the playing of the fish have to be transmitted in torque through this connection, the additional strength thus afforded is a material advantage.

As in my prior application, the spool rotates on a stationary tension bolt 70, and at the tail end the pinion 72 driven by the spool meshes with the gear 74 of the tail end friction brake adjustable by means of the control elements 76 and 78 just as in my prior application above referred to.

At the head end I have provided a handle 80 of improved construction, being of a cylindro-conical configuration with both ends pointed, and being swiveled about the axis of its supporting rod 82. The rod 82 is threaded into the end of the crank 84 and fastened in place by riveting as at 86. The handle proper 80 is fastened on the rod 82 by means of the sleeve 89 having threaded engagement at 90 with the body of the handle and abutting the flange 92. The crank 84 is connected to the gear 86 by the same adjustable friction drive connection as in my prior application above referred to, including the knurled star wheel 88 for adjusting the amount of friction.

Between the gear 86 and the spool I have provided clutch means for completely disconnecting the transmission at will. As illustrated, the pinion 91 meshes at all times with the gear 86 and is constantly urged into clutching engagement with the spool in the position illustrated in Figure 3 by the helico-spiral spring 93. At its opposite end the clutch carries the usual key 94 (see Figure 4) adapted to enter the slot 96 in the hub of the spider 98. Diagonally opposite corners of the slot 96 may be beveled off slightly as clearly indicated at 100 in Figure 7 to ease the parts into engagement. As in my prior application, the spider 98 has a plurality of radiating arms 102, the end of each arm being riveted to the adjacent end bell 65 as indicated at 104 in Figures 3 and 7. Thus the torque transmitted to the end sleeve 64 and spider 98 can find its way into the adjacent end bell 65 either through the rivets 104 or through the sleeve 66 and the dowel pins 68 or both. And the sleeve 64 and dowel pins 68 at the right end of the spool must be relied on to transmit to the sleeve 66 and from the sleeve 66 to the opposite end bell 65 such torque as comes to those portions of the spool from their engagement with the mass of thread on the spool. As these loads are of maximum severity when the spool is relatively full of line, and at a time when the tendency of the line wound on the spool is to expand axially against the end bell 65, it will be seen that the rivets 104 at the head end relieve the main sleeve 66 from carrying a substantial portion of the torque load.

To move the combined clutch and pinion 91, 94 from the full line position of Figure 4 to the dotted line position and disconnect the spool from the head end transmission, I employ a slidable cam plate 106. The clutch sleeve has a peripheral groove at 108 receiving the inner edge of a yoke 110. The slide 106 is U-shaped to leave clearance for the axial movement of the clutch, and the ends of its arms on either side are provided with cams including upwardly inclined portions 112, lands 114 at the upper ends of the inclined portions, and stop flanges 116 at the ends of the lands. The entire slide 106 is guided in a shallow U-shaped housing 118 having elevated side portions riveted to the end plate 50 as by rivets 120, and a depressed flat portion 122 providing a clearance within which the slide 106 is housed and guided. Upon reference to Figures 3 and 4 it will be apparent that withdrawal of the slide 106 from the full line to the dotted line position of Figure 4 will cam the yoke 110 up to the dotted line position of Figure 4, compressing the spring 93 and withdrawing the male clutch member from engagement with the spool. I prefer to proportion the parts so that when they are in position for clutch engagement, the bight of the slide 106, as clearly indicated at 124 in Figure 3, enters the groove 108 and positively holds the clutch against movement out of engagement.

For actuating the slide, I provide the crank 126 provided with a suitable handle 128 and connected to the shaft 130 (see Figures 4 and 5) to rotate the same. The shaft 130 is pivotally supported on a stud 132 rigidly mounted in the depressed portion 122 of the slide housing. The shaft 130 carries the arm 134 in which is riveted a pin 136 projecting below the arm into the plane of the slide 106 and carrying an anti-friction roller 138. The anti-friction roller 138 rides in a transverse slot at 140 (see Figures 6 and 11) in the slide 106. It will be apparent that rotation of the crank 126 will be effective to move the slide 106 back and forth at the will of the user.

I have provided spring biasing means tending to hold the slide 106 either in the full line or the dotted line position of Figure 4 and to prevent it from coming to rest in any intermediate position. As illustrated, this means comprises a spring 142 having a U-shaped central bight and having one end wrapped around the shaft 130 at 144, and the other end connected to a pin 146 projecting up from the slide 106. It will be apparent that as the pin 146 moves in a straight line, the mid portion of which is closer to the shaft 130 than either end portion, the force of the spring 142 will bias the slide 106 and tend to move it into one extreme position or the other.

To secure compactness and small axial dimensions, the arm 134 is in the plane of the head end plate 50 which is cut away as indicated at 148 to give clearance for movement of the arm 134 and is also notched in at 150 to allow the pin 146 to move to the position of Figures 4 and 6. Similarly, the slide 106 is cut away at 152 to permit the slide to move back and forth without striking the shaft 130.

In Figures 10 and 11 I have indicated a minor modification in which the projecting arms 154 of the slide 106' are offset downwardly by substantially the thickness of the metal as indicated at 156. This shifts the parts to that extent further into the end bell 65 and correspondingly reduces the necessary length of the bolt 70 and the height of the housing 158 (see Figure 3) covering this portion of the transmission. As in my prior application above referred to, the tail end plate is covered by a non-metallic plate 160 and the head end plate 50 and associated transmission are covered by a non-metallic cover plate and housing 162.

Without further elaboration the foregoing will so fully explain the invention that others may, by applying knowledge current at the time of application, readily adapt the same for use under various conditions of service.

I claim:

1. In a deep sea fishing reel, in combination: a head end plate; a tail end plate; a unitary one piece frame of metal; said frame being in the form of a truss or spider with openings between the truss elements; said frame having a main portion substantially in the shape of an open letter C when viewed in end elevation along the reel axis; part of the edge of each end plate abutting and being fastened to the adjacent edge of said frame and being secured thereto; said frame and end plates having interlocking tongue and groove connections to maintain alignment; said frame including two sleeves adapted to receive a rod tip and a rod butt; said sleeves extending in opposite directions and being in axial alignment on a line parallel to and midway between the planes of said end plates; and a spool rotatably supported by said end plates for rotation about an axis perpendicular to said end plates; the axis of said sleeves lying below the axis of said spool.

2. In a deep sea fishing reel, in combination: a head end plate; a tail end plate; a unitary one piece frame of metal; said frame being in the form of a truss or spider with openings between the truss elements; said frame having a main portion substantially in the shape of an open letter C when viewed in end elevation along the reel axis; part of the edge of each end plate abutting and being fastened to the adjacent edge of said frame and being secured thereto; said frame and end plates having interlocking tongue and groove connections to maintain alignment; said frame including two sleeves adapted to receive a rod tip and a rod butt; said sleeves extending in opposite directions and being in axial alignment on a line parallel to and midway between the planes of said end plates.

JOSEPH A. COXE.